United States Patent [19]

Chenot et al.

[11] 4,112,194

[45] Sep. 5, 1978

[54] HEXAGONAL HAFNIUM, ZIRCONIUM PHOSPHATE LUMINESCENT MATERIAL, METHOD OF PREPARATION, AND X-RAY INTENSIFYING SCREEN CONTAINING THE SAME

[75] Inventors: Charles Frederic Chenot, Towanda; James Evan Mathers, Ulster; Francis Nathan Shaffer, Towanda, all of Pa.

[73] Assignee: GTE Sylvania Incorporated, Stamford, Conn.

[21] Appl. No.: 739,577

[22] Filed: Nov. 8, 1976

[51] Int. Cl.$^2$ .............................................. C09K 11/42
[52] U.S. Cl. ................................... 428/539; 423/306; 252/301.4 P; 252/301.4 F; 250/460; 250/483
[58] Field of Search ................. 252/301.4 P, 301.4 F; 423/305, 306; 250/483, 460; 428/539

[56] References Cited

U.S. PATENT DOCUMENTS

| | | | |
|---|---|---|---|
| 3,484,383 | 12/1969 | Hoffman | 252/301.4 P X |
| 3,488,292 | 1/1970 | McAllister | 252/301.4 P |
| 3,527,710 | 9/1970 | Toma et al. | 252/301.4 P |
| 3,544,483 | 12/1970 | Lagos | 252/301.4 P |
| 3,905,912 | 9/1975 | Mathers | 252/301.4 P |

OTHER PUBLICATIONS

Alberti et al., "J. Inorg. & Nucl. Chem.", 1974, 36(3) pp. 661–664.

*Primary Examiner*—Jack Cooper
*Attorney, Agent, or Firm*—Norman J. O'Malley; John C. Fox; Donald R. Castle

[57] ABSTRACT

A mixture of starting materials, corresponding to an oxide composition within an area of the ternary diagram for (Hf,Zr)O$_2$, A$_2$O, P$_2$O$_5$ formed by connecting end member points defined by the molar compositions: 45 (Hf,Zr)O$_2$ – 10 A$_2$O – 45 P$_2$O$_5$; 45 (Hf,Zr)O$_2$ – 45 A$_2$O – 10 P$_2$O$_5$; and 10 (Hf,Zr)O$_2$ – 45 A$_2$O – 45 P$_2$O$_5$, reacts to form large single crystalline essentially hexagonal particles of a new compound (Hf$_{1-x}$Zr$_x$)$_{3-y}$A$_{4y}$(PO$_4$)$_4$, and an aqueous-soluble second phase removable by washing. The large single crystalline hexagonal particles are useful as the luminescent material in x-ray intensifying screens, with band emission which overlaps at least partially the absorption edge of an x-ray film base to give good image resolution without crossover distortion.

8 Claims, 4 Drawing Figures

HEXAGONAL HAFNIUM, ZIRCONIUM PHOSPHATE LUMINESCENT MATERIAL, METHOD OF PREPARATION, AND X-RAY INTENSIFYING SCREEN CONTAINING THE SAME

CROSS REFERENCE TO RELATED APPLICATION

Copending U.S. Patent Applications Ser. No. 739,691 and Ser. No. 755,742 assigned to the present assignee, are directed to other hafnium, zirconium phosphate compounds also having utility as luminescent materials, e.g., in x-ray intensifying screens.

Ser. No. 739,691, filed concurrently herewith, relates to large single crystalline essentially cubic particles of $(Hf_{1-x}Zr_x) P_2O_7$ having strong, about 60 nm bandwidth emission, peaking at about 340 nm (on an uncorrected basis) with controlled persistence.

Ser. No. 755,742 includes a 3:1, $(Hf_{1-x}Zr_x)O_2:P_2O_5$ luminescent material having broader band emission and heavier absolute density than the hexagonal compound claimed herein, or on the cubic compound claimed in Ser. No. 739,691.

BACKGROUND OF THE INVENTION

This invention relates to a new compound having utility as a luminescent material, and more particularly relates to a hexagonal hafnium, zirconium phosphate compound luminescent under x-ray, ultraviolet, etc. excitation, and also relates to a method for producing large single crystalline particles of such material, and to x-ray intensifying screens incorporating such material.

A problem associated with x-ray intensifying screens when used with conventional double emulsion x-ray film packs in so-called "cross-over". Cross-over is a loss of resolution on the exposed film attributed to the phenomenon of a photon in the visible spectrum passing through the emulsion on one side of the film pack, through the film base, and exposing the emulsion on the far side. Since the photons are transmitted in all directions from the phosphor on the intensifying screen, the image can become less sharp as a result of the far side exposure. Attempts have been made in the past to incorporate dyes into the film base which would render the base opaque to visible light, thereby eliminating cross-over. Such attempts have not been completely satisfactory.

Currently, x-ray film packs use plastic supports such as polycarbonates, polystyrenes, polyesters and the like as film bases, which while being opaque to ultraviolet light, are transparent to visible radiation. Since the film emulsions are sensitive to ultraviolet light, finding an x-ray phosphor having sufficient brightness (speed) and only emitting in the ultraviolet region would result in a sharp film image by the substantial elimination of crossover.

Self-activated hafnium pyrophosphate, zirconium pyrophosphate, and mixed hafnium, zirconium pyrophosphate luminescent materials, which emit in the lower ultraviolet region of the electromagnetic spectrum, are known. For example, U.S. Pat. No. 2,770,749 issued to A. Bril et al. discloses a zirconium pyrophosphate phosphor. I. Shidlovsky et al., in "Luminescence of Self-activated Hafnium Pyrophosphate", Abstract #95 of the May, 1974 Meeting of the Electrochemical Society, disclose that hafnium pyrophosphate emits in the ultraviolet region more efficiently than zirconium pyrophosphate when excited by photoluminescence and cathodoluminescence. In U.S. Pat. No. 3,941,715, Shidlovsky discloses mixed (Hf,Zr) $P_2O_7$ phosphors which emit in the lower ultraviolet region (below about 3,000 Angstroms) when excited by x-rays, cathode rays or visible radiation.

Hafnium phosphate luminescent materials having the formula $Hf_3(PO_4)_4$ and containing activator elements such as Cu and Eu are disclosed in U.S. Pat. Nos. 3,905,911 and 3,905,912 to J. E. Mathers, and assigned to the present assignee. However, upon excitation by x-rays these materials emit in the visible portion of the spectrum, and are therefore of no utility for x-ray intensifying screen applications requiring ultraviolet emissions.

SUMMARY OF THE INVENTION

In accordance with the invention, a new compound has been discovered having the chemical formula $(Hf_{1-x}Zr_x)_{3-y}A_{4y}(PO_4)_4$, where $x$ is within the range of 0 to 1, $A$ is at least one alkali metal selected from the group consisting of Li, Na and K, and $y$ is within the range of about 0.4 to about 2.0. In addition, the compound has been found to exhibit luminescent properties, both in the self-activated state (emitting in the ultraviolet portion of the spectrum) and when activators are present (e.g., emitting green in the presence of divalent euorpium), upon excitation by x-rays, ultraviolet, etc.

Large essentially single crystalline hexagonal particles of the compound may be prepared by reacting a mixture of starting materials corresponding on an oxide basis to a composition within an area of the ternary system for $MO_2$, $A_2O$ and $P_2O_5$, (where M is selected from the group consisting of hafnium and zirconium, and A is at least one alkali metal selected from the group consisting of lithium, sodium and potassium), wherein the area is defined by end member points having the oxide compositions in mole percent as follows: 45 $MO_2$ - 10 $A_2O$-45 $P_2O_5$; 45 $MO_2$ - 45 $A_2O$ - 10 $P_2O_5$; and 10 $MO_2$ - 45 $A_2O$ - 45 $P_2O_5$. The resulting compound, when separated from an aqueous-soluble alkali metal-containing second phase, exhibits about 60 nm bandwidth emission peaking at about 350 nm (on an uncorrected basis) with controlled persistence upon x-ray excitation.

When used in x-ray intensifying screens and other intensifying devices with conventional silver halide emulsion x-ray film, the luminescent material's band emission overlaps at least to some extent the absorption edge of the x-ray film base, resulting in good image resolution without substantial crossover. In addition, optimum speed and persistence values are obtained for $x$ of about 0.005 to 0.5.

Accordingly, in addition to the hexagonal $(Hf_{1-x}Zr_x)_{3-y}A_{4y}(PO_4)_4$ compound wherein $x$ is within the range of from about 0 to 1, the invention includes such compounds in large particle single crystalline form as a self-activated luminescent material or as a luminescent material host for one or more activators and also includes a method for producing such large single crystalline particulate luminescent materials, and also includes x-ray intensifying screens incorporating such materials in the self-activated state having values of $x$ within the range of about 0.005 to 0.5.

DETAILED DESCRIPTION OF THE INVENTION

For a better understanding of the present invention, together with other and further objects, advantages and capabilities thereof, reference is made to the following disclosure and appended claims in connection with the above-described drawings.

Figure 3:
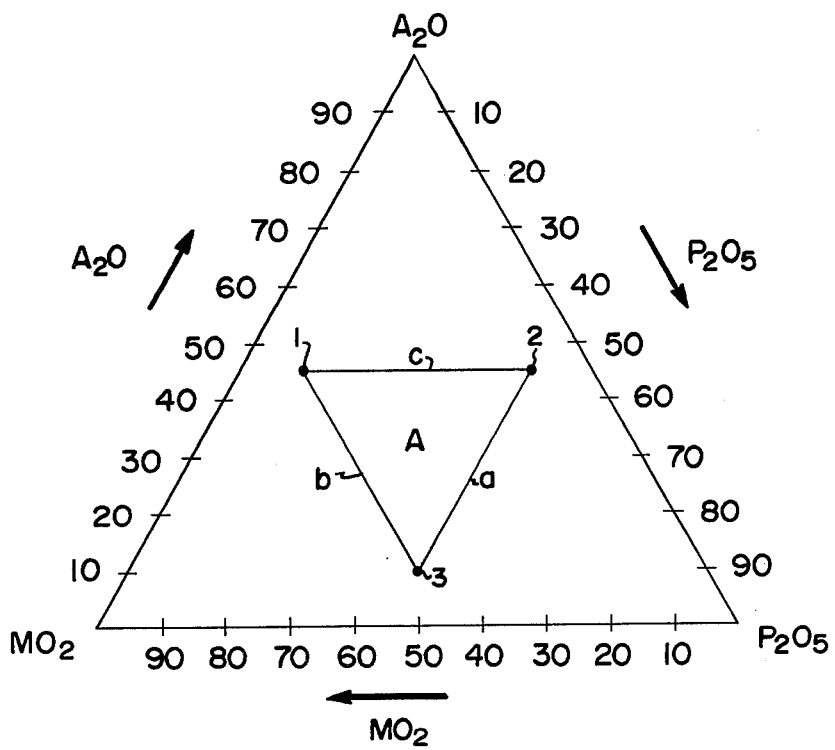
FIG. 3 is a ternary diagram for the $MO_2 - A_2O - P_2O_5$ oxide system having a portion "A" defining the reaction mixtures of the invention.

Referring now to FIG. 3, there is shown a ternary diagram for $MO_2 - A_2O - P_2O_5$, wherein lines "a", "b" and "c" connect end member points 1, 2 and 3 defining molar ratios for $MO_2$, $A_2O$, and $P_2O_5$ of 45:10:45, 45:45:10 and 10:45:45, respectively, to form area "A". Compositions formulated within the area "A" react to a mixture of aqueous-insoluble large single crystalline essentially hexagonal particles of $(Hf_{1-x}Zr_x)_{3-y}A_{4y}(PO_4)_4$ and an aqueous-soluble second phase of alkali phosphates which may be removed from the reaction mixture by a post-reaction water wash treatment.

Compositions so formulated have $y$ values within the range of about 0.5 to 2.0. It should be recognized that some of the A may be lost during processing, especially during the water wash. However, within the above range, and under the processing conditions described herein, sufficient A is retained to achieve the hexagonal structure of the invention. Thus, the final fired and washed composition will have a $y$ value within the range of about 0.4 to 2.0.

Outside the area of the diagram, compositions formulated on the opposite sides of lines "a" and "b" tend to fire to a mixture of hexagonal $(Hf,Zr)_{3-y}A_{4y}(PO_4)_4$ and substantial amounts of cubic $(Hf,Zr) P_2O_7$. Compositions formulated on the opposite side of line "c" tend to fire to some $(Hf,Zr)_{3-y}A_{4y}(PO_4)_4$ plus substantial amounts of soluble alkali-based phases.

The hafnium and zirconium end members have been found to be structurally insomorphous. Thus, while $x$ values determining the molar ratios of hafnium and zirconium may range from 0 to 1, and thus encompass both the hafnium and zirconium end members, for x-ray intensifying screen use, it is preferred to maintain the values of $x$ between about 0.005 and 0.5. It has been found that as the ratio of zirconium to hafnium increases, relative x-ray persistence desirably decreases, but the absolute density of the luminescent material and accordingly the x-ray stopping power of the material undesirably decreases. Based upon these considerations, it is particularly preferred to maintain $x$ within the range of about 0.05 to 0.3 for x-ray intensifying screen applications.

As used herein, the term "precursor" means any compound which upon heating to the reaction temperature or below, decomposes, hydrolyzes or otherwise converts to the desired oxide, such as carbonates, nitrates, sulphates, formates, oxylates, halides, etc. Preferred starting materials are hafnium oxychloride, zirconyl nitrate, dibasic ammonium hydrogen phosphate, and alkali metal fluorides.

A general procedure for preparation of the luminescent materials will now be described. The formulated mixture of starting materials is reacted at a firing temperature within the range of about 800° C to 1300° C for about 1 to 16 hours, to form a fused reaction mass. This mass is then washed with water to substantially remove the aqueous soluble second phase and any soluble contaminant materials, to leave a powder of the substantially single crystalline particles of the luminescent material. The powder may then be dried. Preferably, the mixture is heated at least once prior to firing to a temperature within the range of about 200° C to 500° C for about 1 to 16 hours, in order to insure the removal of at least a portion of contained volatile material, and in some cases to partially decompose and/or prereact precursor materials. This prefiring heat treatment is then followed by mechanically reducing the mixture to a relatively uniform powder mixture, such as by pulverizing or mortaring with a mortar and pestle. In addition, it is preferred to carry out washing by first forming an aqueous slurry of the fused reaction mass, followed by agitating the slurry at a moderate temperature, e.g., within the range of about 80° C to 105° C, until the crystalline powder appears, and then washing the powder with copious amounts of water to remove the soluble second phase and any soluble contaminant materials.

The invention is not limited to the procedure cited above. For example, optimum final firing temperature is contingent upon such factors as hafnium to zirconium ratio, particular alkali flux chosen, etc. Hafnium and zirconium phosphate salts could be precipitated from solution and fired with appropriate alkali-phosphate flux mixtures, or the desired $(Hf_{1-x}Zr_x)_{3-y}A_{4y}(PO_4)_4$ matrix material could be formed and then refired with appropriate alkali-phosphate flux to form large single crystals, without departing from the spirit or scope of the invention.

Table I shows data collected on 12 $(Hf_{1-x}Zr_x)_{3-y}A_{4y}(PO_4)_4$ luminescent material samples obtained from reaction mixtures formulated to fall within the shaded area "A" on FIG. 3, to give an essentially hexagonal structure. Samples 1, 3, 7, 8, 9, 10, 11 and 12 were prepared from starting materials of reactor grade hafnium oxychloride ($HfOCl_2.8H_2O$) containing about 3.1 weight percent zirconium on an elemental basis, corresponding to an $x$ value of 0.057. Samples 4, 5 and 6 were prepared from spectrographic grade hafnium oxychloride, containing about 178 ppm of zirconium. Zirconyl nitrate, dibasic ammonium hydrogen phosphate ($NH_4H_2PO_4$) and $Li_2CO_3$ were the precursors of $ZrO_2$, $P_2O_5$, and $Li_2O$, respectively except in the cases of samples 1 and 2, in which $Na_4P_2O_7.10H_2O$ was the precursor of $Na_2O$, and samples 11 and 12, in which LiF was the precursor of $Li_2O$.

Median particle diameter in micrometers was measured by Coulter Counter. Relative powder cell x-ray speed was measured by the following technique: A powder sample is poured into a brass cup, lightly tapped and smoothed with a spatula, to give a 1 inch diameter by 1/16 inch deep sample. The cup is placed 8 inches from a tungsten target x-ray tube operated at 80 kilovolts and 25 milliamperes. The emissions from the sample are scanned with a grating spectrometer having a photomultiplier tube with spectral sensitivity of 250 to 700 nanometer, to give a first order spectral energy distribution from 300 to 700 nanometers.

the cassette closed. After remaining in the closed cassette for a set time, the film was removed, processed,

TABLE I

| Sample Number | Formulated Oxide Composition - (Mol Percent) | | | | | | Mol Ratio Hf/Zr | Evaluation Data on Fired, Washed and Dried Material | | |
|---|---|---|---|---|---|---|---|---|---|---|
| | $MO_2$ | $HfO_2$ | $ZrO_2$ | $P_2O_5$ | $Na_2O$ | $Li_2O$ | LiF | | Median Particle Diameter | Relative Powder Cell X-ray Speed | Relative Persistence |
| 1 | 40 | — | — | 40 | 20 | — | — | 94.3/5.7 | 7.6 | 64. | V. Strong |
| (X-ray diffraction pattern was hexagon with $a_o$ = 8.78 A, $C_o$ = 22.7 A) | | | | | | | | | | | |
| 2# | — | — | 40 | 40 | 20 | — | — | 0.0#/100. | 6.9 | 5. | |
| (X-ray diffraction pattern was hexagonal with $a_o$ = 8.77 A, $C_o$ = 22.8 A) | | | | | | | | | | | |
| 3 | 40 | — | — | 40 | — | 20 | — | 94.3/5.7 | 11.4 | 219. | V. Strong |
| 4 | — | 40 | — | 40 | — | 20 | — | 100./0.0+ | 9.9 | 69. | V. Strong |
| 5 | — | 37.5 | 2.5 | 40 | — | 20 | — | 93.8/6.2 | 10.8 | 172. | V. Strong |
| 6 | — | 35 | 5 | 40 | — | 20 | — | 87.5/12.5 | 10.1 | 163. | V. Strong |
| 7 | 37.5 | — | 2.5 | 40 | — | 20 | — | 88.6/11.4 | 10.8 | 150. | Weak |
| 8## | 40 | — | — | 40 | — | 20 | — | 94.3/5.7 | 10.0 | 188. | V. Strong |
| 9 | 40 | — | — | 40 | — | 20 | — | 94.3/5.7 | 8.6 | 195. | V. Strong |
| (X-ray diffraction pattern was hexagonal with $a_o$ = 8.80 A, $C_o$ = 22.6 A)* | | | | | | | | | | | |
| 10 | 36 | — | 4 | 40 | — | 20 | — | 85.2/14.8 | 9.1 | 169. | Medium |
| 11 | 40 | — | — | 40 | — | — | 40 | 94.3/5.7 | 11.7 | 212. | V. Strong |
| 12 | 36 | — | 4 | 40 | — | — | 40 | 85.2/14.8 | 10.7 | 172.0 | Medium |

*Diffraction data presented in Table II.
absolute density 3.24
absolute density 4.31

TABLE II

| Sample 9: | |
|---|---|
| d | I |
| 6.24A | 20 |
| 4.715 | 25 |
| 4.444 | 100 |
| 4.385 | 95 |
| 4.080 | 48 |
| 3.760 | 39 |
| 3.654 | 10 |
| 3.335 | 8 |
| 3.124 | 68 |
| 2.890 | 26 |
| 2.853 | 6 |
| 2.810 | 48 |
| 2.580 | 8 |
| 2.547 | 56 |
| 2.540 | 59 |
| 2.467 | 29 |
| 2.362 | 6 |
| 2.227 | 8 |
| 2.199 | 8 |
| 2.110 | 9 |
| 2.087 | 9 |
| 2.049 | 4 |
| 1.986 | 26 |
| 1.972 | 23 |
| 1.905 | 10 |
| 1.831 | 12 |
| 1.800 | 6 |
| 1.747 | 25 |

Formulated $(Hf_{1-x}Zr_x)_{3-y}(Li_{4y})(PO_4)_4$; Scanned at $\frac{1}{4}°$/minute at $1 \times 10^3$
d = interplanar distance
I = relative intensity Relative persistence was measured by a technique similar to that outlined under Federal Specification for X-ray Intensifying Screens - GG-S-00176b.

Several metal coins or other roentgenopaque test objects were placed on the front of a cassette containing screens but no film, and exposed under specified conditions. The cassette was then taken to the dark room and a set time after the termination of the roentgen exposure, the cassette was opened and an unexposed piece of x-ray film was quickly inserted between the screens and the cassette closed. After remaining in the closed cassette for a set time, the film was removed, processed, and examined for evidence of shadows of the test objects.

A medium to weak persistence is generally desired for x-ray intensifying screen applications.

Results shown in Table I reveal that: (a) the hafnium end member (sample 4) had a faster x-ray speed (69) than the zirconium end member (sample 2) (5); (b) except for sample 1, the mixed Hf,Zr samples had (much) faster x-ray speeds than either end member; (c) increased Zr content of the mixed Hf, Zr samples tended to decrease persistence; (d) samples 7, 10, and 12 exhibited medium to weak persistence with fast relative x-ray speeds, making such compositions particularly desirable for x-ray intensifying screen use. (Sample 2, containing no hafnium, was not measured for persistence due to its very low relative x-ray speed).

EXAMPLE I

To better understand the invention, the detailed procedure employed for the synthesis of the samples of Table I is set forth in respect to the specific composition of sample 12.

Table III sets forth the starting materials, their molar ratios, their formula weights, their gram ratios based upon 1 mole, and the batch ratio in grams based upon a 1.25 mole batch.

TABLE III

| | Mol Ratio | Formula Weight | Gram Ratio (1 mol) | Batch Ratio (1.25 mol) (Grams) |
|---|---|---|---|---|
| $HfOCl_2 \cdot 8H_2O$* [Assay 48% $(Hf,Zr)O_2$] | 0.36 | 440.34 | 158.52 | 198.15 |
| Zirconyl Nitrate [Assay 47% | 0.04 | 262.17 | 10.49 | 13.10 |

TABLE III-continued

| | Mol Ratio | Formula Weight | Gram Ratio (1 mol) | Batch Ratio (1.25 mol) (Grams) |
|---|---|---|---|---|
| ZrO$_2$] | | | | |
| NH$_4$H$_2$PO$_4$ | 0.80 | 117.38 | 93.90 | 117.40 |
| [Assay 98%] | | | | |
| LiF | 0.40 | 25.94 | 10.38 | 13.00 |

*containing 3.1 weight percent elemental Zr per unit weight of Hf plus Zr in the raw material.

These starting materials were weighed in accordance with the batch ratio weights shown in the last column of Table III, and blended in a polyethylene bag by intermittently rolling the bag with a rolling pin and shaking the bag. The thus roughly blended material was then divided between two 500 ml volume alumina crucibles, covered, placed in a furnace at 200° C for 3 hours, removed from the furnace and allowed to cool to room temperature. The material was then mortared with a porcelain mortar and pestle, recombined into a single batch, redivided between the two crucibles and reheated for 1.5 hours at 200° C to 260° C, then at 200° C for 16 hours, after which time the crucibles were removed from the furnace and allowed to cool to room temperature. The material was then recombined and mixed using a mortar and pestle. The now homogeneous powder mixture was charged into a single 500 ml alumina crucible, the crucible covered and placed in an electric furnace at 540° C, with the furnace door slightly ajar to allow escape of vapors. The temperature was then increased to about 1075° C over a period of about 4 hours and held at this temperature for about 4 additional hours, with the furnace door closed. The crucible was then removed from the furnace and allowed to cool to room temperature. A white body-colored fused reaction mass resulted.

The fused mass in the crucible was agitated in a pot of boiling water for 1 hour. The material, now dispersed, was allowed to settle, and the supernatent liquid discarded. The settled slurry was then agitated in hot deionized water (at about boiling) for about ½ hour. The material was again allowed to settle and the supernatent liquid discarded. The hot deionized water wash was repeated again twice and the resulting slurry filtered, oven dried and passed through a 100 mesh sieve. The sieved white body-colored, free flowing powder had large single crystalline particulate character and strong emission, (about 60 nm in bandwidth peaking at about 350 nm on an uncorrected basis), with weak persistence, under x-ray excitation.

EXAMPLE II

The general procedure of Example I was used to prepare Sample 10 of Table I, except that a final firing temperature of 1175° C was used. The batch calculations are shown in Table IV.

TABLE IV

| Material | Mol Ratio | Formula Weight | Gram Ratio (1 Mol) | Batch Ratio (1.25 Mol) (Grams) |
|---|---|---|---|---|
| HfOCl$_2$.8H$_2$O* | 0.36 | 440.34 | 158.52 | 198.15 g |
| [Assay 48% (Hf,Zr)O$_2$] | 0.04 | 262.17 | 10.49 | 13.10 |
| [Assay 47% ZrO$_2$] | | | | |
| NH$_4$H$_2$PO$_4$ | 0.80 | 117.38 | 93.90 | 117.40 |
| [Assay 98%] | | | | |

TABLE IV-continued

| Material | Mol Ratio | Formula Weight | Gram Ratio (1 Mol) | Batch Ratio (1.25 Mol) (Grams) |
|---|---|---|---|---|
| Li$_2$CO$_3$ | 0.20 | 73.89 | 14.78 | 18.50 |

*containing 3.1 percent by weight of elemental Zr per unit weight of Hf plus Zr.

Again, a white body-colored, free flowing powder having large single-crystalline particulate character and strong emission, (about 60 nm in bandwidth, peaking at about 350 nm on an uncorrected basis) with short persistence under x-ray excitation was obtained.

While in its broadest aspects the invention essentially is directed to the production of large single crystalline luminescent material, it is contemplated that activator elements or compounds may be added to the material. However, it should be recognized that such activators, depending upon their characteristics, may significantly influence the emission spectra of the material upon excitation by x-rays or other means. To aid the practitioner, an illustrative example is presented.

EXAMPLE III

A divalent Eu-activated (Hf$_{1-x}$Zr$_x$)$_{3-y}$A$_{4y}$(PO$_4$)$_4$ green-emitting phosphor was prepared. Batch calculations are shown in Table V.

TABLE V

| Material | Mol Ratio | Formula Weight | Gram (1 Mol) | Batch Ratio (0.125 Mol) (Grams) |
|---|---|---|---|---|
| HfOCl$_2$.8H$_2$O* | 0.38 | 433.13 | 164.59 | 20.60 |
| [Assay 48.62% (Hf,Zr)O$_2$] | | | | |
| Eu$_2$O$_3$ | 0.01 | 352. | 3.52 | 0.45 |
| NH$_4$H$_2$PO$_4$ | 0.80 | 115.38 | 92.30 | 11.55 |
| [Assay 99.7%] | | | | |
| Li$_2$CO$_3$ | 0.20 | 73.89 | 14.78 | 1.85 |

*containing 3.1 percent by weight of elemental Zr per unit weight of Hf plus Zr.

The starting materials were blended using the bag rolling and shaking procedure of Example I. The material was then heated at about 200° C for about 2 hours, allowed to cool and comminuted and blended in a mortar and pestle. These heating and mortaring steps were then repeated, and the resulting homogeneous mixture was heated from 500° C to 1200° C in about 3.5 hours, held at 1200° C for about 4.5 hours, and allowed to cool to room temperature. A slurry of the reaction mass was agitated in boiling water for about ¾ hours, and then subjected to three hot deionized water washes as in Example I. The settled slurry was then filtered, dried, and passed through a 60-mesh sieve. A portion of this material was then fired in flowing nitrogen-hydrogen atmosphere mixture containing about 5 percent hydrogen at about 1165° C for about 1 hour and cooled, still in the flowing N$_2$ plus H$_2$ atmosphere, to room temperature to reduce all of the Eu to the divalent state. The material as formulated had the composition (Hf$_{1-x-z}$Zr$_x$Eu$_z$)$_{3-y}$Li$_{4y}$(PO$_4$)$_4$, where $x$, $y$ and $z$ had the approximate values 0.05, 0.6, and 0.05, respectively. The material exhibited a soft texture and green luminescence under ultraviolet excitation.

Figure 1:
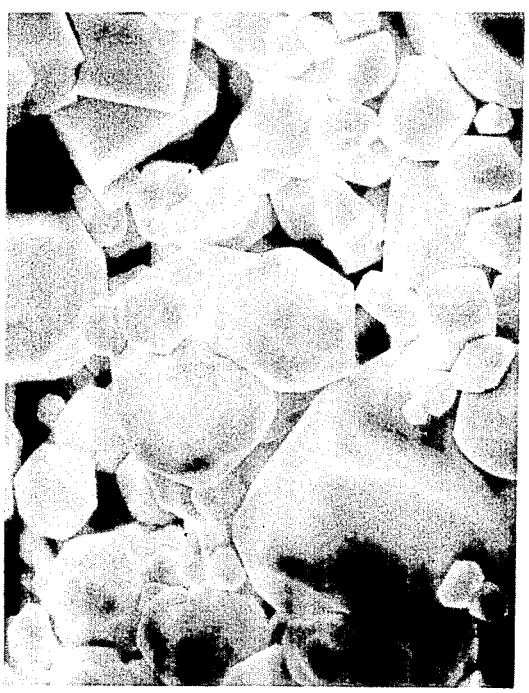
FIG. 1 is a photomicrograph of single crystalline essentially cubic particles of (Hf,Zr) $P_2O_7$ prepared from an oxide composition of 25 mole percent $(Hf_{1-x}Zr_x)O_2$; 50 mole percent $P_2O_5$; and 25 mole percent $Na_2O$.
Figure 2:
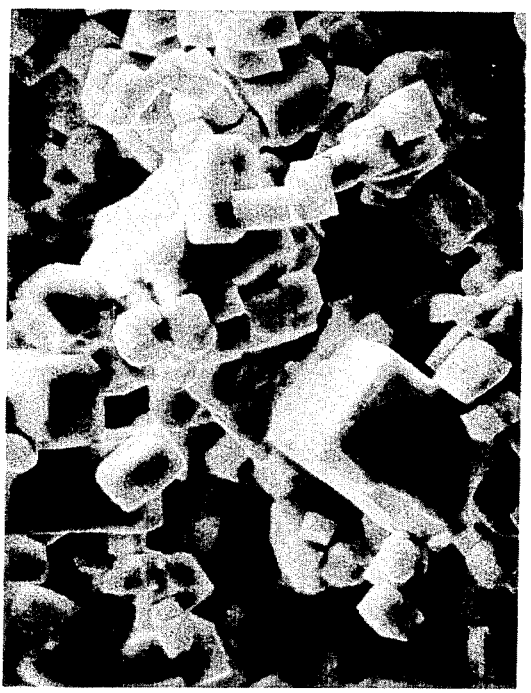
FIG. 2 is a photomicrograph of single crystalline essentially hexagonal particles of $(Hf,Zr)_{3-y}Li_{4y}(PO_4)_4$ prepared from an oxide composition of 40 mole percent $(Hf_{1-x}Zr_x)O_2$, 40 mole percent $P_2O_5$ and 20 mole percent $Na_2O$.

Referring now to FIGS. 1 and 2, photomicrographs at 2000 × magnification of crystalline powders of MP$_2$O$_7$ described and claimed in copending U.S. Patent application Ser. No. 739,691, filed concurrently herewith, and M$_{3-y}$Na$_{4y}$(PO$_4$)$_4$, respectively, are shown.

The material of FIG. 1 was formulated from a reaction mixture of starting materials corresponding on oxide basis to 25 mole percent $(Hf_{1-x}Zr_x)O_2$, 50 mole percent $P_2O_5$ and 25 mole percent $Na_2O$, heated from 500° C to 1350° C in 3 hours and fired at 1350° C for 5 hours. The material of FIG. 2 was formulated from a reaction mixture of starting materials corresponding on an oxide basis to 40 mole percent $(Hf_{1-x}Zr_x)O_2$, 40 mole percent $P_2O_5$ and 20 mole percent $Na_2O$, falling within the area "A" of FIG. 3, heated from 500° C to 1350° C in 3 hours and fired at 1350° C for 5 hours. Comparison of the photomicrographs shows large single crystalline particles in each case, the particles of FIG. 1 being cubic and those of FIG. 2 being hexagonal. The hexagonal material exhibits a longer wavelength emission band peak (350 nm, versus 340 nm on an uncorrected basis, for the cubic material) and greater absolute density values, leading to greater x-ray stopping power.

Figure 4:
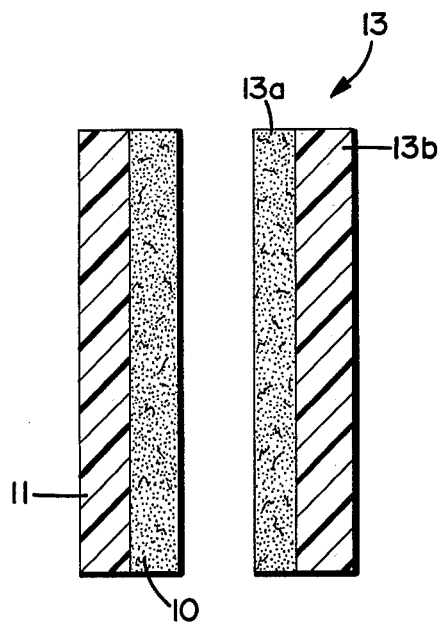
FIG. 4 is a schematic diagram of an x-ray intensifying screen incorporating the luminescent material of the invention, in cooperative relationship with a silver halide emulsion x-ray film.

Referring now to FIG. 4, there is shown one embodiment of an x-ray intensifying screen 10 incorporating a base layer 11 substantially transparent to x-rays, but substantially opaque to visible and ultraviolet radiation. Such base layer could be of a plastic material. A layer of an x-ray excitable luminescent material is secured to base layer 11, for example, by dispersing the material in an organic binder matrix and coating the matrix on the base layer. Incoming x-rays, upon striking the luminescent layer, stimulate ultraviolet emissions in all directions. However, the opaqueness of the base layer 11 to such ultraviolet radiation results in the substantial redirection of such radiation away from the base layer and toward an x-ray film 13 of base layer 13b and emulsion layer 13a. Since the film is more sensitive to the ultraviolet radiation than to x-rays, the image produced upon the film by the exposure of the film to such radiation is thereby intensified.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent material with hexagonal crystal structure consisting essentially of large single crystalline particles of $(Hf_{1-x}Zr_x)_{3-y}A_{4y}(PO_4)_4$; where $x$ is within the range of about 0.005 to 0.5, $A$ is at least one alkali metal selected from the group consisting of lithium, sodium and potassium and $y$ is within the range of 0.4 to 2.0.

2. The luminescent material of claim 1 wherein $x$ is within the range of 0.05 to 0.3.

3. A process for producing a luminescent material consisting essentially of large single-crystalline hexagonal particles of $M_{3-y}A_{4y}(PO_4)_4$ wherein $M$ is selected from the group consisting of Hf and Zr, expressed as $(Hf_{1-x}Zr_x)$ where $x$ is within the range of 0 to 1, and $A$ is at least one alkali metal selected from the group consisting of Li, Na and K, the process comprising:
    (a) first forming a mixture of compounds selected from the group consisting of $MO_2$, $A_2O$, $P_2O_5$ and precursors thereof, which mixture upon an oxide basis falls within the area A of the ternary diagram for $MO_2$ - $A_2O$ - $P_2O_5$ of FIG. 3 of the drawing, the area A defined by points in the diagram corresponding to mole proportions of the oxides of: 45 $MO_2$ - 10 $A_2O$ - 45 $P_2O_5$; 45 $MO_2$ - 45 $A_2O$ - 10 $P_2O_5$; and 10 $MO_2$ 45 $A_2O$ - 45 $P_2O_5$, respectively;
    (b) firing the mixture to a temperature within the range of about 800° C to 1300° C for about 1 to 16 hours, to form a fused reaction mass;
    (c) washing the mass with water to substantially remove aqueous-soluble contaminant material, thereby leaving a powder of substantially single crystalline particles; and
    (d) drying the powder.

4. The process of claim 3 wherein prior to firing the mixture is:
    (a) heated at least once to a temperature within the range of from about 200° C to 500° C for about 1 to 16 hours, in order to insure removal of at least a portion of contained volatile material, followed by
    (b) comminuting the heated mixture to a relatively uniform powder mixture.

5. The process of claim 3 wherein washing comprises:
    (a) forming an aqueous slurry of the fused reaction mass;
    (b) agitating the slurry at a temperature within the range of from about 80° C to 105° C until a crystalline powder appears; and
    (c) water washing the powder.

6. The process of claim 3 wherein $x$ is within the range of 0.005 to 0.5.

7. An x-ray intensifying screen for use with conventional silver halide emulsion x-ray film to intensify an exposed image on the film, the screen comprising:
    (a) a base layer of a material substantially transparent to x-rays, but substantially opaque to visible and ultraviolet radiation; and
    (b) a layer of an x-ray excitable luminescent material secured to base layer,
characterized in that the luminescent material consists essentially of large single-crystalline hexagonal particles of $(Hf_{1-x}Zr_x)_{3-y}A_{4y}(PO_4)_4$, wherein $A$ is at least one alkali metal selected from the group consisting of Li, Na and K, $x$ is within the range of 0.005 to 0.5, and $y$ is within the range of 0.4 to 2.0, whereby good resolution of the image is achieved without substantial cross-over.

8. The x-ray intensifying screen of claim 7 wherein the $x$ is within the range of about 0.05 to 0.3.